_United States Patent_ [19]

Poapst et al.

[11] 4,123,558

[45] Oct. 31, 1978

[54] COATING OF POTATOES TO PREVENT GREENING

[75] Inventors: Peter A. Poapst, Kentville; Frank R. Forsyth, Berwick, both of Canada

[73] Assignee: Canadian Patents and Development Limited, Ottawa, Canada

[21] Appl. No.: 703,886

[22] Filed: Jul. 9, 1976

Related U.S. Application Data

[63] Continuation-in-part of Ser. No. 498,813, Aug. 19, 1974, abandoned.

[30] Foreign Application Priority Data

Aug. 8, 1975 [CA] Canada .................................. 233131

[51] Int. Cl.² ................................................ A23B 7/16
[52] U.S. Cl. .................................... 426/268; 426/310; 426/321; 426/546; 426/637
[58] Field of Search ................ 426/102, 262, 268–270, 426/310, 321, 323, 544–546, 637, 419, 302

[56] References Cited

U.S. PATENT DOCUMENTS

| | | | |
|---|---|---|---|
| 2,700,613 | 1/1955 | Smith | 426/321 |
| 2,819,973 | 1/1958 | Robbins | 426/321 |
| 3,051,578 | 8/1962 | Kitzke | 426/262 |
| 3,390,098 | 6/1968 | Van Ness | 426/544 |

FOREIGN PATENT DOCUMENTS 159,917  11/1954  Australia .................................. 426/302

_Primary Examiner_—Raymond N. Jones
_Assistant Examiner_—Esther M. Kepplinger
_Attorney, Agent, or Firm_—Lorne C. Shaw; W. John McClenahan; H. Wayne Rock

[57] ABSTRACT

A method for preventing greening due to chlorophyll formation in raw unpeeled cold-stored potato tubers exposed to light prior to and including retail sale which comprises spraying or dipping the tubers in an aqueous emulsion containing a single surfactant so as to form a thin continuous film in and on the surface of the tuber which is relatively impermeable to carbon dioxide thereby ensuring an atmosphere containing at least 15% $CO_2$ within the film and in the tuber. The surfactant preferably contains long chain fatty acid moieties and polyoxyalkylene or polyhydroxy moieties, and has an HLB rating below about 15. A modified process involves the addition of an organic acid, selected from aliphatic mono- and polycarboxylic acids having from 2–6 carbon atoms and at least one hydroxy or oxo group, and lactones thereof, excepting those dicarboxylic acids which readily form internal anhydrides, to the surfactant mixture in order to "tighten" the surfactant film formed on the tubers under treatment.

11 Claims, 5 Drawing Figures

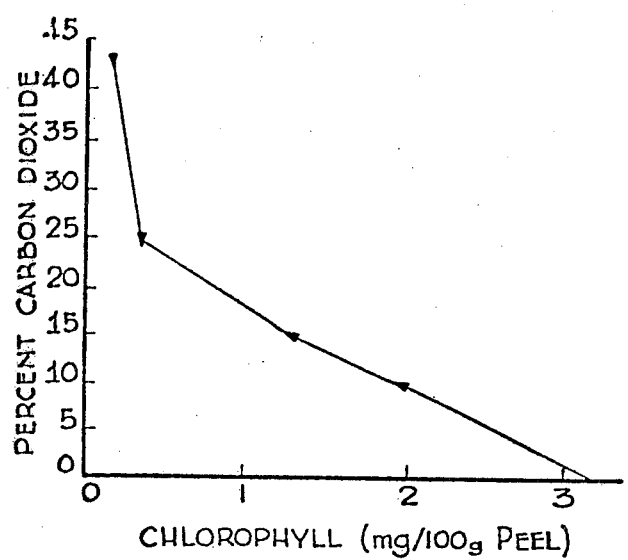
Fig-1-
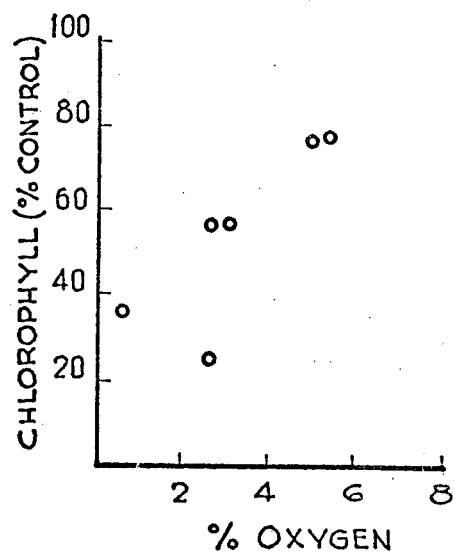
Fig-2-

COATING OF POTATOES TO PREVENT GREENING

This is a continuation-in-part of U.S. application Ser. No. 498,813, filed Aug. 19, 1974, now abandoned.

This invention relates to the treatment of raw, unpeeled, cold-stored potato tubers to prevent greening thereof.

Many varieties of potatoes green rapidly when exposed to light and this has become a major problem in marketing potatoes in "see-through" plastic bags in supermarkets. Exposure to light intensities as low as 100 foot-candles for as little as 24 hours can cause greening in potatoes. Such light intensities are frequently attained by the fluorescent lighting commonly employed in supermarkets. Such exposure not only causes greening, which has been shown to be due to chlorophyll formation, but also causes bitterness and off-flavour. Bitterness and off-flavour are believed to be due to an excess of the alkaloid, solanine. Ingestion of green potatoes containing large amounts of solanine may cause severe illness and, occasionally, death in man. Traditionally, therefore, green potatoes are rejected by the consumer who, at the same time, wishes to see what he or she is buying and demands the use of transparent packaging materials.

In Australian Pat. No. 159,917 (Nov. 23, 1954) Goldhammer discloses a method of treating certain natural vegetable market products by the application to their surfaces of diluted non-cationic surfactant. Goldhammer defines "natural" to imply that the product is in the state in which it is recovered, that is "garden fresh". The object of the Goldhammer invention was to retain freshness of fruit, vegetables and flowers which could be treated at harvest in the state in which they were recovered. No mention is made of subterranean vegetables. The Goldhammer invention was made before or at about the time when brightly lighted North American supermarkets and plastic packaging were developing. The greening problem with potatoes due to these marketing conditions did not exist at that time.

Many compositions and methods for overcoming the problem of greening in potatoes have been suggested. For example, the use of controlled special atmospheres either in bulk or in gas tight sale containers or bags is suggested in U.S. Pat. No. 3,533,810 but is acknowledged to be unduly expensive and cumbersome; furthermore, moisture accumulation in the bags is considered unsightly. Similarly, the use of specially coloured fluorescent lights (e.g. green and gold) has been proposed but has only limited effectiveness and applicability. Hot wax dipping with and without the addition of minor amounts of surfactant to aid wetting has been proposed in U.S. Pat. No. 2,755,189 and in other references but, although effective, is expensive and suffers from the disadvantages that the wax is relatively difficult to remove without damaging the skin of the potato thus severely limiting the manner in which the potato may be prepared for table use. Wu et al (J. Amer. Soc. Hort. Sci. 97(5) 614–616, 1972) have suggested that the problem may be overcome by dipping the potato tubers in corn oil, such as that sold under the trade mark "MAZOLA", but this is relatively expensive, may result in suffocation of the tuber and furthermore limits the way in which the tubers may be cooked as the oil cannot easily be removed without removing the epidermal layer or skin of the tuber. U.S. Pat. No. 3,051,578 suggests treating potatoes with a diluent containing ethylene-diamine tetra-acetic acid (EDTA) or its calcium, sodium or potassium salts. However, because of the sequestering action of EDTA on calcium, a very limited use of the calcium salt only of EDTA is permitted for use in foods in at least some countries including Canada where this invention was made. Neither EDTA nor any of its salts can be applied to raw agricultural foodstuffs in certain countries including Canada. While regulations in the U.S.A., Great Britain and other countries may differ somewhat in detail they are believed similar in intent. Thus the method is currently unacceptable for commercial use.

It is therefore an object of the present invention to provide a cheap, simple, safe and effective method for treating potatoes to prevent greening due to the production of chlorophyll when the potatoes are removed from cold storage and before they are sold at the retail level.

It has been found that chlorophyll production can be substantially completely inhibited in an atmosphere containing at least 15% $CO_2$ but as noted hereinabove it has been found generally impractical to provide an external $CO_2$ atmosphere. We have discovered that an internal $CO_2$ atmosphere within the potato tubers is equally effective. It has been found that for a period of about 48 hours after removal from cold storage, potato tubers undergo a burst of aerobic respiratory activity which generates carbon dioxide.

Because respiratory activity is several times greater in the epidermal layer contrasted to the white underlying storage tissue, and because the escape of $CO_2$ is blocked on most of the area comprising the external side by our invention, a gradient of high $CO_2$ concentration in the epidermal layers to low concentrations in the white central tissues quickly develops. Within a few days an average internal concentration of 15% $CO_2$ or greater develops within the tuber, producing a $pCO_2$ sufficient to retain concentrations of $CO_2$ in the epidermis at a high level, thus compensating for lower $CO_2$ production when the respiratory burst phenomenon has subsided, and sufficient to stop chlorophyll formation. Lenticels, tiny imperfections in the potato skin and in the structure of the surfactant layer (believed to be "micelle-like"), permit the $CO_2$ to back inwards away from the barrier on the epidermis and eventually diffuse through the aforementioned tiny openings to the atmosphere. The problem then is to provide a suitable film around the tuber which is relatively impermeable to $CO_2$ so as to cause $CO_2$ to accumulate within the tuber by aerobic respiration so that the concentration near the potato surface will be controlled at the minimum concentration required to prevent greening, generally considered to be about 15%. The film must also be capable of uniform application and relatively permeable to oxygen in order to preclude the development of anaerobiosis or smothering over the range of temperatures encountered from low temperature storage to retailing. The film material must also be transparent and edible as it may not always be removed prior to preparation for table use.

We have found that suitable film forming materials may be selected from non-toxic long chain fatty acid derivatives commonly used as food-grade surfactants. In particular, we have found that non-ionic slightly lipophilic to moderately hydrophilic polyoxyethylene sorbitan fatty acid esters, sorbitan fatty acid esters and polyethylene glycol fatty acid esters for example are suitable. All of the above surfactants are presently used by food processors, and may also be applied to foodstuffs in pesticide formulations and post-harvest treatments. Their use is not monitored on raw agricultural products and they are therefore believed to be acceptable additives by Federal Regulatory Authorities.

Thus, by one aspect of the present invention there is provided a method for treating raw, unpeeled, cold-stored potato tubers to prevent greening due to chlorophyll development which comprises applying an emulsion comprising a surfactant and water to said tubers in a quantity sufficient to form a continuous thin film of said surfactant thereon and drying thereon; said surfactant containing long chain fatty acid moieties and polyoxyalkylene or polyhydroxy moieties and having an HLB below about 15. We have found that the emulsion is preferably applied to the tubers so as to ensure a surfactant pick up in the range of 0.15 to 0.75 g/kg of tuber.

As previously noted, the film forming materials found suitable to resist the exodus of $CO_2$ from the potato tubers are generally long chain fatty acid esters or glycerides which are relatively common surfactants. We have found that the series of polyoxyethylene sorbitan fatty acid esters sold under the Registered Trade Mark TWEEN by Atlas Chemical Corp. are generally suitable, TWEEN 85 in particular, and also, ethoxylated fatty acid substituted mono- and diglycerides such as ALDOSPERSE MS-20 (trademark of Glyco Chemicals Inc.) and STARFOL D (trademark of Ashland Chemicals). Somewhat more limited use may be made of the series of sorbitan fatty acid esters sold under the Registered Trade Mark SPAN by Atlas Chemical Corp. Polyethylene glycol fatty acid esters selected from those sold under the Registered Trade Mark PEGOSPERSE may also be suitable.

The invention will now be described in more detail with reference to the following drawings in which:

FIG. 1 is a graph showing development of chlorophyll under elevated $CO_2$ and normal $O_2$ concentrations in peel removed from Kennebec tubers 48 hours earlier and exposed to laboratory temperatures (24°-27°) and minimum bench level illumination of 1076 lx.

FIG. 2 is a graph showing development of chlorophyll under reduced $O_2$ in peel removed from Kennebec tubers 48 hours earlier and exposed to laboratory temperatures (24°-27°) and minimum bench level illumination of 1076 lx.

Figure 4:
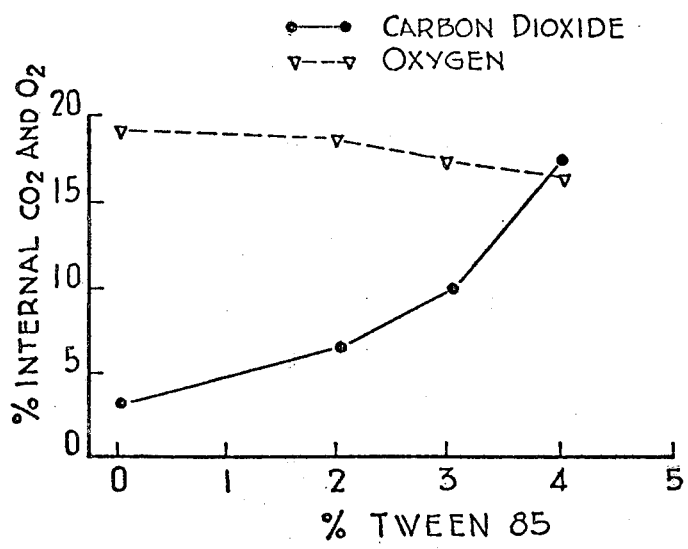
Figure 5:
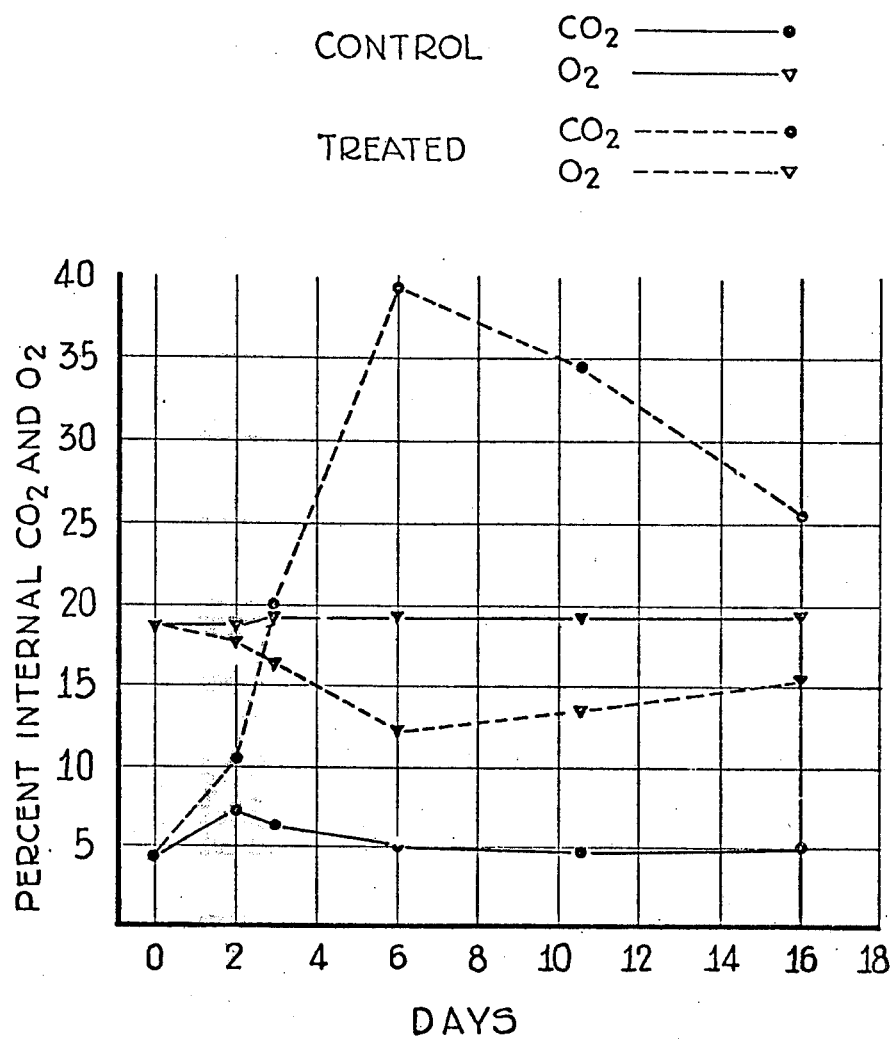

FIG. 4 is a graph showing internal $CO_2$ and $O_2$ concentrations in potato tubers (numbered clone) sprayed to runoff with various concentrations of TWEEN 85 immediately following withdrawal from 5° C. storage and measured after 5 days at laboratory temperatures (24°-25° C.); and FIG. 5 is a graph showing changes in internal $CO_2$ and $O_2$ concentrations in Kennebec tubers sprayed to runoff with 4% TWEEN 85 immediately after withdrawal from 5° C. storage.

In order to illustrate the present invention a series of experiments was conducted.

EXAMPLE 1

Tubers from cvs.* Avon, Fundy, Keswick and Kennebec and a numbered clone were used. Because Kennebec greened most readily it was used most often. Whole tubers, previously stored in darkness at 5° C., were exposed to laboratory temperatures of 21°-27° C. and to a minimum illumination at the bench level of 1076 lx (cool white fluorescent) on a continuous basis. When required, discs of peel tissue were cut with a No. 6 stainless cork borer and excised at a depth of 0.16 cm with a stainless steel knife.
* certified varieties Chlorophyll in potato discs was estimated visually and by the method of Arnon (Plant Physiol. 24, 1–15, 1949) using a Beckman DB spectrophotometer and five discs (0.75 g) per sample.

$CO_2$ and $O_2$ were determined with a Fry analyser whose calibrated capacity was matched with a 1 ml all glass syringe. Internal gases from tubers were sampled using a quick evacuation technique. This technique utilizes the purging action of steam at prevailing atmospheric pressure, and the subsequent vacuum formed after the system is sealed and the steam condensed. (Amer. Potato J. 51(6) 197–201, 1974)

Respiratory $CO_2$ was determined with the aid of a Beckman infrared gas analyser.

Discs sampled from treated and untreated potatoes were variously exposed to air and to concentrations of $CO_2$, $O_2$ and balance $N_2$, by placing them on moistened Whatman No. 3. filters in open glass dishes; tissues and dishes were contained in humid environments inside wide mouthed glass preserving jars of 3640 ml capacity.

The tubers were sprayed to the point of runoff with an aqueous emulsion formulated with TWEEN 60 (polyoxyethylene (20) sorbitan monostearate) or TWEEN 85 (polyoxyethylene (20) sorbitan trioleate). All applications were made immediately after withdrawal of the tubers from storage.

RESULTS

Anti-greening treatments

The amount of material required to control greening varied substantially with the cv (Tables 1 and 2). A 15% emulsion of TWEEN 60 controlled greening in the susceptible Kennebec cv. On a weight of material applied basis, TWEEN 85 was the most efficient substance; a residual of 0.40 g/kg of tuber, applied by spraying to runoff with a 5% emulsion was generally more than required. Control of greening was largely assessed by visual means and was considered more than adequate if chlorophyll did not exceed 0.40 mg/100 g peel.

$CO_2$, $O_2$, and greening in excised peel

When discs from control tubers were retained in atmospheres, containing high concentrations of $CO_2$ (and 20% $O_2$ balance $N_2$), chlorophyll development decreased with increased $CO_2$ concentration (FIG. 1). However, concentrations as high as 40% allowed some chlorophyll formation. When discs were retained in atmospheres of reduced $O_2$ (and 0.0% $CO_2$, balance $N_2$), there was no inhibition of chlorophyll formation until $O_2$ concentrations were reduced below 5% (FIG. 2). When discs were retained in atmospheres of increasing $CO_2$ concentrations with the $O_2$ fixed at a slightly reduced level (15%), and balance in $N_2$ the results closely resembled those of FIG. 1.

$CO_2$ output from tubers treated with TWEEN 85

Figure 3:
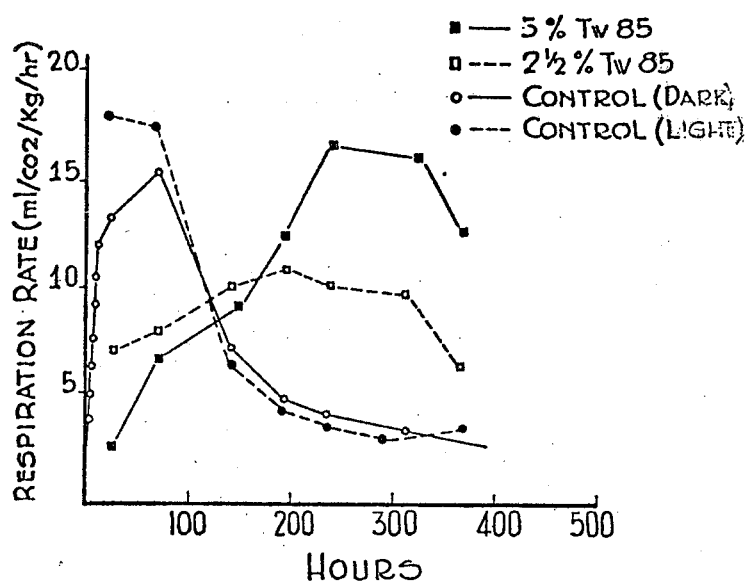
FIG. 3 is a graph showing respiration measured at 21° C. in Kennebec tubers in the interval following withdrawal from 5° C. storage. Tubers were sprayed to runoff with TWEEN 85 and retained in light at laboratory temperatures (24°-27° C.).

TWEEN 85 suppressed or delayed the normal respirational "burst" which results when the tuber is removed from low temperature storage to higher temperatures (FIG. 3). The suppressed $CO_2$ "burst" indicates that the gas was accumulating within the treated tuber. The treatment tended to sustain the $CO_2$ output at higher levels when compared with controls over the whole period of observation (15 days approx.). Ultimately respiration declined sharply toward the control level.

Internal $CO_2$ and $O_2$ in tubers treated with TWEEN 85

The concentration of the applied surfactant, and thus presumably its weight, had a direct influence on the accumulation of internal $CO_2$ and the slight decline in internal $O_2$ (FIG. 4). In this instance a concentration of 4% TWEEN 85, which was sufficient to control greening, produced average internal concentrations of 17% $CO_2$ and 16% $O_2$ (approx.) 5 days after treatment. The pronounced accumulating effect of 4% TWEEN 85 on internal $CO_2$ in Kennebec tubers is seen in FIG. 5. Although both $CO_2$ and $O_2$ concentrations began to return to normal 6 days after treatment, $CO_2$ concentrations still differed sharply from the controls after 16 days.

TABLE 1

Green color development in potato tubers treated with aqueous emulsions of Tween 60 and retained at laboratory temperatures (24° - 27° C) under a minimum of 1076 1x fluorescent light (CW)

| | Chlorophyll (mg/100 g peel) | | |
|---|---|---|---|
| | Kennebec[a] | Avon[a] | Keswick[b] |
| Control (water) | 6.75 | 3.67 | 4.44 |
| 5% Tween 60 | 8.08 | 0.28 | 1.11 |
| 10% Tween 60 | 3.31 | 0.08 | 0.39 |
| 15% Tween 60 | 0.31 | — | — |
| Initial color | 0.07 | 0.05 | 0.06 |

[a]After 13 days
[b]After 36 days

TABLE 2

Greening assessment in potato tubers treated with aqueous emulsions of Tween 85 and retained at laboratory temperature (24° - 27° C) under a minimum of 1076 1x fluorescent light (CW)

| | Greening - after 6 days % Tween 85 | | | |
|---|---|---|---|---|
| Variety | 0.0 | 2.5 | 5.0 | 7.5 |
| Avon | — | — | — | — |
| Keswick | +− | — | — | — |
| Fundy | + | +− | — | — |
| Kennebec | +++ | +− | — | — |
| | Greening - after 13 days | | | |
| Avon | + | +− | — | — |
| Keswick | + | +− | — | — |
| Fundy | ++ | + | — | — |
| Kennebec | ++++ | ++ | — | — |

Other observations

In some instances both TWEEN 60 and TWEEN 85 were applied to tubers at substantially higher concentrations than were required to stop greening. TWEEN 60 at 20%, and TWEEN 85 at 7.5% produced glossy surfaces (an apparent film) which persisted for several hours and even days. Under these conditions internal $CO_2$ approached 100% (>90%) and internal $O_2$ approached zero (<1.5%) and some tubers suffocated. When these glossy surfaces were abraded (or punctured), thus removing both surfactant and epidermal layers, greening developed in the area proximal to the abrasion.

EXAMPLE 2

The experiments described in Example 1 were repeated the following season using a more comprehensive collection of Tweens. Kennebec tubers were again sprayed to runoff, but dips in warmed emulsions were used to apply TWEEN 61 (65.6° C.) and TWEEN 65 (40.6° C.). Visual assessment was relied on to determine the presence or absence of greening. Chlorophyll concentrations were determined in tubers treated at surfactant concentrations proximal to the "optimum" using the method of Arnon (ibid), 0.75 g of peel, and a Beckman Model DB spectrophotometer; in greened potatoes, tissues were selected from the greenest areas. Greening was observed to occur when determinations exceeded 0.85 mg/75 g. peel.

When compared with previous observations, the figures in Table 3 indicated an increased effectiveness with TWEEN 20, 80 and 60, while that of TWEEN 85 remained unchanged.

Using linear interpolation, the weights of surfactant applied at the concentrations listed in Table 3, and the figure 0.85 mentioned above, the weight rate of each surfactant required to control greening was calculated and is listed in Table 4. It is readily apparent that Tweens vary widely in their relative efficacy, and that efficacy in terms of concentration does not necessarily relate to efficacy in terms of mass applied.

EXAMPLE 3

Cold stored (5° C.) cv Kennebec tubers were sprayed with aqueous emulsions of mixtures of TWEEN AND SPAN and then exposed to continuous fluorescent illumination (cs 1076 lx) for 15 days. The results are tabulated in Table 5.

EXAMPLE 4

Cold stored Kennebec tubers were sprayed with various PEGOSPERSE surfactants and exposed to fluorescent light as in Example 3. The weight of surfactant required to control greening for the different surfactants is tabulated in Table 6.

EXAMPLE 5

Cold stored Kennebec tubers were sprayed with aqueous mixtures of ALDOSPERSE MS-20 (POE 20 glyceryl monostearate, HLB 13.1) and of STARFOL D (ethoxylated mono and diglyceride, HLB 13.6) and exposed to fluorescent light for 14 days. The results tabulated in Table 7 confirm that fatty acid glycerides per se are effective in preventing greening when used according to the present invention.

TABLE 3

TWEEN surfactants in aqueous emulsions ranked for greening control in Kennebec tubers. Tubers were treated on removal from 5° C storage, retained 15 days at laboratory temperature (21° - 27° C) under continuous fluorescent illumination (cw 1076 1x).

| | Zero greening Conc.[+] (%) | Reduced greening | | |
|---|---|---|---|---|
| Rank | | Conc.[++] (%) | Chlorophyll[+++] (%) | HLB±1 |
| 1. Tween 81 | 3.0 | 2.0 | 17.3 | 10.0 |
| 2. Tween 65 | 4.0 | 2.0 | 81.3 | 10.5 |
| 3. Tween 85 | 5.0 | 4.0 | 27.9 | 11.0 |
| 4. Tween 61 | 6.0 | 4.0 | 26.4 | 9.6 |
| 5. Tween 60 | 6.0 | 4.0 | 65.0 | 14.9 |
| 6. Tween 80 | 12.0 | 10.0 | 16.3 | 15.0 |
| 7. Tween 21 | 12.0 | 9.0 | 28.9 | 13.3 |
| 8. Tween 40 | 15.0 | 12.0 | 18.0 | 15.6 |

TABLE 3-continued

TWEEN surfactants in aqueous emulsions ranked for greening control in Kennebec tubers. Tubers were treated on removal from 5° C storage, retained 15 days at laboratory temperature (21° – 27° C) under continuous fluorescent illumination (cw 1076 1x).

| | Zero greening | Reduced greening | | |
|---|---|---|---|---|
| Rank | Conc.+ (%) | Conc.++ (%) | Chlorophyll+++ (%) | HLB±1 |
| 9. Tween 20 | 16.0 | 12.0 | 59.8 | 16.7 |

+Lowest concentration tested that controlled greening.
++Highest concentration tested that failed to control greening.
+++Chlorophyll content of treated relative to untreated tubers.
P.O.E. (No.) - Number of polyoxyethylene units
Tween 81 - P.O.E. (5) sorbitan monooleate
Tween 85 - P.O.E. (20) sorbitan trioleate
Tween 80 - P.O.E. (20) sorbitan monooleate
Tween 61 - P.O.E. (4) sorbitan monostearate
Tween 65 - P.O.E. (20) sorbitan tristearate
Tween 60 - P.O.E. (20) sorbitan monostearate
Tween 40 - P.O.E. (20) sorbitan monopalmitate
Tween 21 - P.O.E. (4) sorbitan monolaurate
Tween 20 - P.O.E. (20) sorbitan monolaurate
Span 20 - P.O.E. (0) sorbitan monolaurate

TABLE 4

The weight of various TWEEN surfactants required to be applied either as an aqueous spray or dip to control greening in Kennebec tubers subsequently exposed for 15 days to continuous fluorescent light (cw 1076 lx) at laboratory temperatures (21–27° C).

| Surfactant | Weight/ kg of tubers |
|---|---|
| 1. TWEEN 81 - P.O.E. (5) Sorbitan monooleate | 0.15 |
| 2. TWEEN 85 - P.O.E. (20) Sorbitan trioleate | 0.23 |
| 3. TWEEN 60 - P.O.E. (20) Sorbitan monostearate | 0.27 |
| 4. TWEEN 80 - P.O.E. (20) Sorbitan monooleate | 0.44 |
| 5. TWEEN 40 - P.O.E. (20) Sorbitan monopalmitate | 0.71 |
| 6. TWEEN 65 - P.O.E. (20) Sorbitan tristearate* | 0.83 |
| 7. TWEEN 61 - P.O.E. (4) Sorbitan monostearate** | 0.94 |
| 8. TWEEN 20 - P.O.E. (20) Sorbitan monolaurate | 0.98 |
| 9. TWEEN 21 - P.O.E. (4) Sorbitan monolaurate | 1.32 |

P.O.E. (No.) - Number of polyoxyethylene units
*Applied as a dip at 40.6° C.
**Applied as a dip at 65.6° C.

TABLE 5

Chlorophyll development in cold-stored Kennebec tubers (5° C) after 15 days exposure at laboratory temperatures (21–27° C) to continuous fluorescent illumination (cw 1076 lx). Some tubers were sprayed with aqueous emulsions of TWEEN and SPAN prepared in 1:1 ratios by weight. Readings <0.85 mg indicate no chlorophyll development.

| TWEEN* SPAN** conc. (%) | Chlorophyll (mg/75 g peel) | | | | | |
|---|---|---|---|---|---|---|
| | TW 20 SP 20 | TW 40 SP 40 | TW 60 SP 60 | TW 65 SP 65 | TW 80 SP 80 | TW 85 SP 85 |
| 6.0:6.0 | 0.18 ± .04 | | | | | |
| 5.0:5.0 | | 0.15 ± .05 | | | | |
| 4.0:4.0 | 0.67 ± .03 | 2.50 ± .01 | | | 0.16 ± .00 | |
| 3.0:3.0 | | | 1.74 ± .09 | | 4.14 ± .08 | 2.81 ± .07 |
| 2.5:2.5 | | | | 0.45 ± .04 | | 0.43 ± .05 |
| 2.0:2.0 | | | 2.61 ± .05 | 0.75 ± .08 | | 0.29 ± .12 |
| 0 | 4.04 ± .22 | 5.29 ± .73 | 6.54 ± .04 | 4.05 ± .23 | 6.54 ± .04 | 5.29 ± .73 |

*TWEEN 20 - polyoxyethylene (20) sorbitan monolaurate
TWEEN 40 - polyoxyethylene (20) sorbitan monopalmitate
TWEEN 60 - polyoxyethylene (20) sorbitan monostearate
TWEEN 65 - polyoxyethylene (20) sorbitan tristearate
TWEEN 80 - polyoxyethylene (20) sorbitan monooleate
TWEEN 85 - polyoxyethylene (20) sorbitan trioleate
**SPAN (no) - consists of corresponding TWEEN molecule without polyoxyethylene units, i.e., SPAN 20 - sorbitan monolaurate.

TABLE 6

The weight of various PEGOSPERSE surfactants applied as aqueous sprays to control greening on cold-stored (5° C) Kennebec tubers subsequently exposed for 15 days to continuous fluorescent light (cw 1076 lx) at laboratory temperatures (21–27° C).

| | Surfactant | | | | Wt/kg of tubers |
|---|---|---|---|---|---|
| 1. | Polyethylene | glycol | (400) | dintriricinoleate | 0.15 g |
| 2. | " | " | " | dilaurate | 0.20 g |
| 3. | " | " | " | monotallate | 0.24 g |
| 4. | " | " | " | dioleate | 0.36 g |
| 5. | " | " | (200) | monolaurate | 0.56 g |
| 6. | " | " | " | dilaurate | 0.75 g |

TABLE 7

Greening assessment in Kennebec potato tubers treated with aqueous mixtures of ALDOSPERSE MS-20 and of STARFOL D upon removal from 5° C dark storage. Tubers were retained at 22° C under a minimum of 1076 lx fluorescent light (CW)

| Treatment % | Mass applied g/kg of tuber | Greening visually rated | | Chlorophyll mg/100 g peel |
|---|---|---|---|---|
| | | 10 days | 14 days | 14 days |
| ALDOSPERSE MS-20 | | | | |
| 0 | 0.00 | ++++ | +++++ | 7.59 |
| 2 | 0.08 | +++ | +++++ | 6.13 |
| 4 | 0.32 | + | ++ | 1.89 |
| 6 | 0.52 | − | + | 0.36 |
| 8 | 0.77 | − | − | 0.29 |
| STARFOL D | | | | |
| 0 | 0.00 | +++++ | +++++ | 8.30 |
| 2 | 0.12 | ++ | ++++ | 3.80 |
| 4 | 0.30 | − | − | 0.34 |
| 6 | 0.66 | − | − | 0.31 |
| 8 | 1.02 | − | − | 0.21 |

ALDOSPERSE MS-20 (HLB 13.1) POE 20 glyceryl monostearate.
STARFOL D (HLB 13.6) ethoxylated mono and diglycerides having an oxyethylene content of 60.5 – 65.0%.

From the above experimental results we have determined that greening control depends, at least to some extent, upon the molecular structure of the surfactant added and it is believed that the following generalizations hold:

| Comparing | TWEEN 81, 85, 80 - shortening POE increasing fatty acid substitution | } beneficial |
|---|---|---|
| Comparing | TWEEN 65, 61, 60 - | |

| | -continued | |
|---|---|---|
| | shortening POE | beneficial |
| | increasing fatty acid substitution | |
| Comparing | TWEEN 20, 21 - shorteniing POE | beneficial |

Comparing TWEEN 20, 21 and SPAN 20 beneficial effects may be ranked: tristearate > trioleate > monostearate > monooleate > monopalmitate > monolaurate.

Thus it is surmised that the non-ionic TWEEN surfactants appear to conform in structural characteristics and functional concentrations to the principles of micelle formation as described by Schonfeldt (1969) in Surface Active Ethylene Oxide Adducts. It is therefore suggested that these surfactants regulate the exchange of $CO_2$ by the formation of a film composed of a micelle layer in and on the surface of the tuber.

Furthermore, it is believed that effectiveness in greening control is related to the HLB (Hydrophile-Lipophile Balance) rating of the surfactant used. The HLB rating of a surfactant is a well-known method of assigning a numerical value to surfactants to provide a classification based upon their behaviour and solubility in water. Essentially the HLB rating is a function of the weight percentage of the hydrophilic portion of the molecule of a non-ionic surfactant. The experimental procedure to determine HLB values is long and tedious but has been described in detail in the literature (J. Soc. Cosmetic Chem. I, 311–326, 1949), and comparative ranking lists have been published by Griffin in J. Soc. Cosmetic Chem. V, No. 4, p. 249, December, 1954.

Representative surfactants examined for use in the present invention have HLB ratings (as listed in The American Perfumer and Essential Oil Review, Vol. 65, No. 5, p. 27–29, May, 1955) as follows:

TABLE 8

| Surfactant | Chemical Designation | HLB Rating (±1) |
|---|---|---|
| SPAN 85 | Sorbitan triolate | 1.8 |
| SPAN 65 | Sorbitan tristearate | 2.1 |
| SPAN 80 | Sorbitan monooleate | 4.3 |
| SPAN 60 | Sorbitan monostearate | 4.7 |
| SPAN 20 | Sorbitan monolaurate | 8.6 |
| TWEEN 81 | Polyoxyethylene sorbitan monooleate | 10.0 |
| TWEEN 65 | Polyoxyethylene sorbitan tristearate | 10.3 |
| TWEEN 85 | Polyoxyethylene sorbitan trioleate | 11.0 |
| TWEEN 60 | Polyoxyethylene sorbitan monostearate | 14.9 |
| TWEEN 80 | Polyoxyethylene sorbitan monooleate | 15.0 |
| TWEEN 40 | Polyoxyethylene sorbitan monopalmitate | 15.6 |
| TWEEN 20 | Polyoxyethylene sorbitan monolaurate | 16.7 |

From a consideration of the molecular structure of the surfactants outlined above in relation to the test results reported in Examples 1-5, we have determined that for effective and economical control of greening in susceptible potato tubers, surfactants having an HLB rating below about 15 are most suitable. Preferably, a surfactant having an HLB rating in the range between about 8.6–11.0 should be employed. Above HLB 11, the amount of surfactant required for effective control may become excessive in some potato varieties.

In a modified process according to the present invention we have found that when the escape of respirational $CO_2$ is impeded and thus caused to accumulate within the potato tuber tissue, the acids participating in the respiration (TCA cycle acids) may accumulate, or their rate of consumption may be reduced. Additionally, other plant acids may also accumulate. Thus, potato tuber tissues experiencing anaerobic conditions are known to accumulate lactic acid and applicants have, in fact, observed in increase in hydrogen ion concentration (pH 6 to pH 3.5 approx.) in tuber peel treated with effective concentrations of surfactant. Further, the presence of mild acids in plant tissues is known to cause a proton shift degrading chlorophyll to brown pheophytin. However, when acid is applied externally in a non-phytotoxic manner, new chlorophyll develops upon exposure of the tuber to light, as soon as the applied acid is metabolized or diluted. But, if the escaping respirational $CO_2$ is restricted slightly with a "small" amount of surfactant (that is less than what is required to control greening), the applied acid may be caused to persist for a few days, thus precluding the redevelopment of chlorophyll during that time. This effect however can be greatly reinforced by a "tightening" of the surfactant film, applied to the tuber, by the addition of certain organic acids as "builders".

Not all organic acids function as "builders". For various reasons, formic, acetic, propionic, maleic, fumaric, L-malic, succinic, oxalic, D(−)-quinic, benzoic, 4-hydroxybenzoic, 3,4-dihydroxybenzoic, 2,5-dihydroxybenzoic, 4-hydroxy-3-methoxybenzoic, 3,5-dimethoxy-4-hydroxybenzoic, and 2-hydroxybenzoic acids were completely ineffective when tested for this purpose with 2% TWEEN 60. Tannic acids and tannin quickly produced an immobile sludge with 2% TWEEN 60. 4-Hydroxyphenylpropionic acid gave inconsistent results while the effect of ethylenediaminetetraacetic acid (EDTA) was very weak.

The organic acids found to be useful as builders according to this invention are selected from aliphatic mono- and polycarboxylic acids having from 2 to 6 carbon atoms and at least one hydroxy or oxo group, and lactones thereof, except those dicarboxylic acids which readily form internal anhydrides.

The organic acids may be added to the aqueous surfactant emulsion at the time of preparation and appear to be compatible (soluble in emulsion) with the surfactant. Thus, the amount of surfactant required to produce an effective film upon application to the tuber may be reduced far below the concentration required for control of greening by the surfactant alone, and by the addition of increasing amounts of the selected acid can be rendered sufficiently impermeable to $CO_2$. Effective combinations of surfactant and selected acid are many, and permit attenuation of the safe and effective concentration ranges. We have found that the organic acid may be added to the surfactant mixture in an amount up to 15% by weight.

The use of "builders" permits a kaleidoscope of formulations producing films of various strengths and longevities. It allows the application of a film which will self-destruct, thus precluding the risk of anaerobiosis in the plant product. Examples of organic acids useful as builders are citric, lactic, ascorbic, tartaric, isoascorbic, glycolic, glyoxylic, gluconic, ketoglutaric and glyceric acids. It reduces the amount of surfactant required and renders the use of relatively ineffective Tweens, such as TWEEN 60 and TWEEN 80, quite feasible. Of the Tweens, TWEEN 60, TWEEN 65 and TWEEN 80 are the most acceptable from the point of view of present food laws and usage. (ALDOSPERSE MS-20 and STARFOL D are highly acceptable food additives.) Additionally, by using "builders", the effective concentration of TWEEN 65 can be reduced below 3%, thus eliminating viscosity problems.

Examples of acids which are effective in "tightening" surfactant films, are enumerated in Tables 9 and 14. An indication of their relative performance is shown in Tables 10 to 13 and 15 to 17.

TABLE 9

The relative inhibitory effect on greening in Kennebec tubers sprayed to run-off with aqueous emulsions of TWEEN 60 combined with various plant acids. Tubers were sprayed upon removal from 3.3° C storage and retained at 22.2° C under fluorescent illumination (1076 lx).

| Treatment | | Days before greening |
|---|---|---|
| 1. | Water only | 1 |
| 2. | 2% TWEEN 60 | 1 |
| 3. | 2% TWEEN 60 + 7.5% lactic ac. | 3 |
| 4. | 2% TWEEN 60 + 15% lactic ac. | 5 |
| 5. | 2% TWEEN 60 + 5% ascorbic ac. | 3 |
| 6. | 2% TWEEN 60 + 10% ascorbic ac. | 4 |
| 7. | 2% TWEEN 60 + 7.5% tartaric ac. | 3–6 |
| 8. | 2% TWEEN 60 + 15% tartaric ac. | 5–8 |
| 9. | 2% TWEEN 60 + 5% D-isoascorbic ac. | 3 |
| 10. | 2% TWEEN 60 + 10% D-isoascorbic ac. | 8 plus |
| 11. | 2% TWEEN 60 + 5% citric ac. | 17 plus |

TABLE 10

Internal $CO_2$ and $O_2$ in Kennebec tubers treated with (i) water only - controls (ii) TWEEN 60 (iii) TWEEN 60 plus citric acid, upon removal from 3.3° C storage and retained for various intervals at 22.2° C under fluorescent illumination (CW-1076 lx).

| | Day | | | | | | | |
|---|---|---|---|---|---|---|---|---|
| | 0 | | 3 | | 5 | | 7 | |
| Treatment | *$CO_2$ | $O_2$ | $CO_2$ | $O_2$ | $CO_2$ | $O_2$ | $CO_2$ | $O_2$ |
| Control | 3.5 | 19.5 | 2.6 | 19.5 | 4.1 | 19.5 | 2.3 | 18.8 |
| 2% TWEEN 60 | 3.5 | 19.5 | 3.7 | 19.0 | 3.5 | 19.0 | 2.5 | 19.0 |
| 2% TWEEN 60 + 5% citric acid. | 3.5 | 19.5 | 7.8 | 18.4 | 17.6 | 15.5 | 16.3 | |
| 2% TWEEN 60 + 10% citric acid** | 3.5 | 19.5 | 9.5 | 18.5 | 16.7 | 15.9 | 25.1 | 15.2 |

*% $CO_2$ and % $O_2$
**measurements entered under day 3 and 5 actually made on day 2 and 4 respectively.

TABLE 11

Respiration of Kennebec tubers in the interval following withdrawal from 3.3° C storage when retained at 21° C and under fluorescent illumination of 1076 lx. Tubers were sprayed immediately upon removal from storage with (i) water (controls), (ii) 2% TWEEN 60, (iii) 2% TWEEN 60 plus 7.5% lactic acid, (iv) 2% TWEEN 60 plus 15% lactic acid, (v) 2% TWEEN 60 plus 7.5% tartaric acid, (vi) 2% TWEEN 60 plus 15% tartaric acid.

| | Respiration rates (ml $CO_2$/kg tissue/hr) | | | | | |
|---|---|---|---|---|---|---|
| Day | Control | 2% TW 60 | 2% TW 60+ 7.5% lactic | 2% TW 60+ 15% lactic | 2% TW 60+ 7.5% tart. | 2% TW 60+ 15% tartaric |
| 0 | 5.0 | | | | | |
| 1 | 15.9 | 15.9 | 5.3 | 3.1 | 1.9 | 1.7 |
| 2 | 17.3 | 13.5 | 7.9 | 6.2 | 3.5 | 3.3 |
| 3 | 15.1 | 13.2 | 8.6 | 7.1 | 4.5 | 4.6 |
| 8 | 6.4 | 7.2 | 8.1 | 7.2 | 6.8 | 6.8 |
| 9 | 5.5 | 6.2 | 7.0 | 6.7 | 6.5 | 6.5 |
| 10 | 5.4 | 6.0 | 6.9 | 6.7 | 7.7 | 6.8 |
| 13 | 4.3 | 4.3 | 5.3 | 5.9 | 7.4 | 7.0 |

TABLE 12

Respiration of Kennebec tubers in the interval following withdrawal from 3.3° C storage when retained at 21° C and under fluorescent illumination of 1076 lx. Tubers were sprayed immediately upon removal from storage with (i) water (controls) (ii) 2% TWEEN 60, (iii) 2% TWEEN 60 plus 5% citric acid, (iv) 2% TWEEN 60 plus 10% citric acid, (v) 2% TWEEN 60 plus 15% citric acid.

| | Respiration rates (ml $CO_2$/kg. tissue/hr) | | | | |
|---|---|---|---|---|---|
| Day | Control | 2% TW 60 | 2% TW 60+ 5% citric ac. | 2% TW 60+ 10 citric ac. | 2% TW 60+ 15% citric ac. |
| 0 | 6.7 | | | | |
| 1 | 18.4 | 11.2 | 2.2 | 1.9 | 1.4 |
| 2 | 17.0 | 11.8 | 3.3 | 2.6 | 1.7 |
| 3 | 15.2 | 13.2 | 6.6 | 5.3 | 4.4 |
| 4 | 10.5 | 0.7 | 6.6 | 5.8 | 5.2 |
| 7 | 6.6 | 7.4 | 7.7 | 6.8 | 8.6 |
| 9 | 6.3 | 6.0 | 8.5 | 8.6 | 13.0 |
| 10 | 6.7 | 5.7 | 9.7 | 9.2 | 13.3 |
| 11 | 5.7 | 5.0 | 9.4 | 9.5 | 11.9 |
| 14 | 5.6 | 3.8 | 10.0 | — | — |
| 16 | 6.4 | 4.6 | 12.1 | 12.4 | 12.2 |
| 17 | 7.0 | 4.7 | 13.3 | 13.6 | 12.8 |

TABLE 13

Reduction in $CO_2$ exodus from Kennebec tubers after treatment with aqueous emulsions of Tweens and ALDOSPERSE MS-20 surfactants mixed with citric acid solutions. Tubers retained in dark at 22.2° C until respiration rate constant; 24 hours after treatment, rate measured again

| Treatment | $CO_2$ exodus reduction (%) |
|---|---|
| 2% TW 20 | 38 |
| 2% TW 20 + 5% citric acid monohydrate | 69 |
| 2% TW 20 + 10% citric ac. monohydrate | 70 |
| 2% TW 20 + 15% citric ac. monohydrate | 100 |
| 2% TW 21 | 79 |
| 2% TW 21 + 5% citric ac. monohydrate | 91 |
| 2% TW 21 + 10% citric ac. monohydrate | 100 |
| 2% TW 21 + 15% citric ac. monohydrate | 100 |
| 2% TW 40 | 21 |
| 2% TW 40 + 5% citric ac. monohydrate | 68 |
| 2% TW 40 + 10% citric ac. monohydrate | 91 |
| 2% TW 40 + 15% citric ac. monohydrate | 92 |
| 2% TW 60 | 19 |
| 2% TW 60 + 5% citric ac. monohydrate | 82 |
| 2% TW 60 + 10% citric ac. monohydrate | 100 |
| 2% TW 60 + 15% citric ac. monohydrate | 100 |
| 2% TW 61 | 12 |
| 2% TW 61 + 5% citric ac. monohydrate | 83 |
| 2% TW 61 + 10% citric ac. monohydrate | 93 |
| 2% TW 61 + 15% citric ac. monohydrate | 93 |
| 2% TW 65 | 17 |
| 2% TW 65 + 5% citric ac. monohydrate | 64 |
| 2% TW 65 + 10% citric ac. monohydrate | 95 |
| 2% TW 65 + 15% citric ac. monohydrate | 95 |
| 2% TW 80 | 30 |
| 2% TW 80 + 5% citric ac. monohydrate | 52 |
| 2% TW 80 + 10% citric ac. monohydrate | 76 |
| 2% TW 80 + 15% citric ac. monohydrate | 83 |
| 2% TW 81 | 68 |
| 2% TW 81 + 5% citric ac. monohydrate | 78 |
| 2% TW 81 + 10% citric ac. monohydrate | 90 |

TABLE 13-continued

Reduction in $CO_2$ exodus from Kennebec tubers after treatment with aqueous emulsions of Tweens and ALDOSPERSE MS-20 surfactants mixed with citric acid solutions. Tubers retained in dark at 22.2° C until respiration rate constant; 24 hours after treatment, rate measured again

| Treatment | $CO_2$ exodus reduction (%) |
|---|---|
| 2% TW 81 + 15% citric ac. monohydrate | 89 |
| 2% TW 85 | 50 |
| 2% TW 85 + 5% citric ac. monohydrate | 61 |
| 2% TW 85 + 10% citric ac. monohydrate | 87 |
| 2% TW 85 + 15% citric ac. monohydrate | 86 |
| 2% ALDOSPERSE MS-20 | 24 |
| 2% ALDO + 5% citric ac. monohydrate | 57 |
| 2% ALDO + 10% citric ac. monohydrate | 83 |
| 2% ALDO + 15% citric ac. monohydrate | 83 |

TABLE 14

Greening in Kennebec tubers sprayed with aqueous emulsions of TWEEN 80 and various substances upon removal from 3.3° C storage, and after, retained in fluorescent light (cool white - 1100 1x) at 22.2° C.

| Treatment | \multicolumn{6}{c}{Greening visually rated[a]} | Chlorophyll[b] mg/100 g peel 7 (days) | Mass TW 80 applied g/kg of tuber | Emulsion[c] acidity pH |
| --- | --- | --- | --- | --- | --- | --- | --- | --- | --- |
|  | 2 | 3 | 4 | 5 | 6 | 7 (days) | | | |
| Control (distilled water) | 2 | 3.5 | 4 | 5 | 5 | 5 | 4.10 | | |
| 4% TWEEN 80 | 2 | 3.5 | 4 | 5 | 5 | 5 | 3.96 | 0.19 | 5.71 |
| 4% TW 80 + 10% lactic acid | — | 0.5 | 1 | 1.5 | 2 | 3 | 2.70 | 0.22 | 1.90 |
| 4% TW 80 + 10% glycolic acid | — | 1 | 1 | 1.5 | 2 | 3 | 2.05 | 0.25 | 2.00 |
| 4% TW 80 + 10% d-tartaric acid | — | — | 0.5 | 1 | 1 | 1 | 1.01 | 0.22 | 1.62 |
| 4% TW 80 + 10% L-ascorbic acid | — | — | — | — | 0.5 | 0.5 | 0.69 | 0.23 | 2.20 |
| 4% TW 80 + 10% glyoxylic acid | — | — | — | — | — | 0.5 | 0.71 | 0.24 | 1.70 |
| 4% TW 80 + 10% gluconic acid | — | — | — | — | — | — | 0.72 | 0.21 | 2.18 |
| 4% TW 80 + 10% α-ketoglutaric acid | — | — | — | — | — | — | 0.36 | 0.24 | 1.40 |
| 4% TW 80 + 10% D-isoascorbic acid | — | — | — | — | — | — | 0.26 | 0.24 | 2.21 |
| 4% TW 80 + 10% citric acid monohydrate | — | — | — | — | — | — | 0.38 | 0.24 | 1.71 |

[a] Greening visually rated; 0–5 in 0.5 steps (estimating green area and intensity)
[b] Chlorophyll; analysis of 6 discs removed with No. 6 borer (total area 6.23 cm) from the most intensely greened areas
[c] All emulsions appeared to be clear.

TABLE 15

Greening in Kennebec tubers sprayed with aqueous emulsions of TWEEN 65 and citric acid upon removal from 3.30° C storage, and after, retained in fluorescent light (cool white - 1100 1x) at 22.2° C.

| Treatment | 1 | 2 | 3 | 4 | 5 | 6 | 7 (days) | Chlorophyll[b] mg/100 g peel 7 (days) | Mass TW 65 applied g/kg of tuber | Emulsion acidity pH |
| --- | --- | --- | --- | --- | --- | --- | --- | --- | --- | --- |
| Control (distilled water) | 1.5 |  | 2.5 | 5 | 5 | 5 | 5 | 4.63 | | |
| 2.75% TWEEN 65 | 1 |  | 2 | 4 | 4 | 5 | 5 | 3.82 | 0.16 | 6.65 |
| 2.75% TW 65 + 2.5% citric acid[c] | — | — | 0.5 | 0.5 | 0.5 | 1 | 1.08 | 0.21 | 2.18 | |
| 2.75% TW 65 + 5.0% citric acid[c] | — | — | — | — | — | — | — | 0.11 | 0.23 | 2.00 |
| 2.75% TW 65 + 10.0% citric ac.[c] | — | — | — | — | — | — | — | 0.13 | 0.23 | 1.79 |

[a] Greening visually rated; 0–5 in 0.5 steps (estimating green area and intensity)
[b] Chlorophyll; analysis of 6 discs removed with No. 6 borer (total area 6.23 cm$^2$) from the most intensely greened areas
[c] Citric acid monohydrate

TABLE 16

Greening in Kennebec tubers sprayed with aqueous emulsions of Aldosperse MS-20 and citric acid upon removal from 3.3° C storage, and after, retained in fluorescent light (cool white - 1100 1x) at 22.2° C

| Treatment | 1 | 2 | 3 | 4 | 5 | 6 | 7 (days) | Chlorophyll[b] mg/100 g peel 7 (days) | Mass Aldo MS-20 applied g/kg of tuber | Emulsion acidity pH |
| --- | --- | --- | --- | --- | --- | --- | --- | --- | --- | --- |
| Control (distilled water) | 1 | 3 | 4 | 4.5 | 4.5 | 4.5 | 5 | 3.92 | | 3.35 |
| 3% Aldosperse MS-20[c] | 1 | 3 | 3.5 | 4 | 4 | 4 | 5 | 3.34 | 0.15 | 3.35 |
| 3% Aldo + 2.5% citric ac.[d] | — | 1.5 | 2 | 3 | 3 | 3 | 4 | 3.23 | 0.15 | 2.20 |
| 3% Aldo + 5.0% citric ac.[d] | — | — | 0.5 | 1 | 1 | 1 | 2 | 1.90 | 0.17 | 2.00 |
| 3% Aldo + 10.0% citric ac.[d] | — | — | — | 0.5 | 0.5 | 0.5 | 1 | 1.79 | 0.18 | 1.80 |

[a] Greening visually rated; 0–5 in 0.5 steps (estimating green area and intensity)
[b] Chlorophyll analysis of 6 discs removed with No. 6 borer (total area 6.23 cm$^2$) from the most intensely greened areas
[c] Glyco monglyceride type surfactant (ALDOSPERSE MS-20 (polyoxyethylene (20) mono- and diglycerides of edible fatty acids)
[d] Citric acid monohydrate

Table 17

Greening in Kennebec tubers sprayed with aqueous emulsions of Starfol D and citric acid upon removal from 3.3° C storage, and after, retained in fluorescent light (cool white - 1100 1x) at 22.2° C

| Treatment | 1 | 2 | 3 | 4 | 5 | 6 | 7 (days) | Chlorophyll[b] mg/100 g peel 7 (days) | Mass Star D applied g/kg of tuber | Emulsion acidity pH |
| --- | --- | --- | --- | --- | --- | --- | --- | --- | --- | --- |
| Control (distilled water) | 2 | 3 | 4 | 4 | 4 | 5 | 5 | 3.76 | | |
| 3% Starfol d[c] | 1 | 2 | 3 | 3 | 3 | 4 | 4.5 | 3.14 | 0.16 | 6.45 |
| 3% Star D + 2.5% citric ac.[d] | — | — | 2 | 2 | 2 | 2.5 | 3.5 | 3.57 | 0.16 | 2.18 |
| 3% Star D + 5.0% citric ac.[d] | — | — | — | — | 0.5 | 1.5 | 1.5 | 1.62 | 0.16 | 2.00 |
| 3% Star D + 10.0% citric ac[d] | — | — | — | — | — | 0.5 | 0.5 | 1.64 | 0.17 | 1.80 |

[a] Greening visually rated; 0–5 in 0.5 steps (estimating green area and intensity)
[b] Chlorophyll; analysis of 6 discs removed with No. 6 borer (total area 6.23 cm$^2$) from the most intensely greened areas
[c] Ashland Chemical Co. monoglyceride type surfactant (STARFOL D also known as Polyglycerate 60) (ethoxylated mono- and diglycerides)
[d] Citric acid monohydrate Table 10, which is a similar and analogous compilation of data to that shown in FIGS. 4 and 5, clearly shows the effect of adding certain acids to an aqueous surfactant emulsion (or solution) on the build-up of internal $CO_2$, so essential to the control of greening within the tuber. This physical phenomenon can also be appreciated by examining Tables 11 and 12 which are analogous to FIG. 3, as well as by examining Tables 14 to 17. Table 13 illustrates an essential characteristic of the process of this invention; it also indicates that all Tweens can be expected to show some synergism with "builders".

We claim:

1. A method for treating, raw, unpeeled, cold-stored potato tubers to inhibit greening due to chlorophyll development which comprises applying a mixture consisting essentially of water and as active anti-greening agent one of (a) an effective amount up to about 15% of the mixture of a non-toxic or food grade surfactant or (b) a mixture of said surfactant with an organic acid which is selected from the group consisting of mono- or polycarboxylic acids having from 2 to 6 carbon atoms and at least one hydroxy or oxo group, and lactones thereof, excepting those dicarboxylic acids which readily form internal anhydrides, to said tubers in a quantity which is sufficient upon drying to form a thin continuous micelle containing film of said surfactant thereon; said surfactant consisting essentially of long chain fatty acid moieties, and at least one of polyoxyalkylene and polyhydroxy moieties and having an HLB rating below about 15.

2. A method as claimed in claim 1 wherein said surfactant has an HLB rating in the range between about 8.5 and about 11.5.

3. A method as claimed in claim 2 wherein sufficient emulsion is applied so as to ensure a surfactant pick up on said tubers in the range 0.15–0.75 g/kg of tuber.

4. A method as claimed in claim 3 wherein said surfactant is selected from the group consisting of: (a) long chain polyoxyethylene sorbitan fatty acid esters, (b) long chain sorbitan fatty acid esters and (c) long chain polyethylene glycol fatty acid esters.

5. A method as claimed in claim 4 wherein said surfactant is a polyoxyethylene sorbitan trioleate in an amount between 0.2 and 0.6 g/kg of tubers.

6. A method of claimed in claim 4 wherein said surfactant is polyoxyethylene sorbitan monooleate in an amount between 0.15–0.45 g/kg.

7. A method as claimed in claim 4 wherein said surfactant is a sorbitan monolaurate in an amount between 0.15–0.45 g/kg.

8. A method as claimed in claim 1 wherein said antigreening agent is as defined by (b).

9. A method as claimed in claim 8 wherein said organic acid is selected from the group consisting of lactic acid, ascorbic acid, tartaric acid, gluconic acid, isoascorbic acid, citric acid, glycolic acid, glyoxylic acid, α-keto glutaric acid, and glyceric acid.

10. A method as claimed in claim 9 wherein said acid is present in an amount up to about 15%.

11. A film-forming, aqueous surfactant plus carboxylic acid mixture for treating raw, unpeeled, cold-stored potato tubers to inhibit greening due to chlorophyll development consisting essentially of from 2% to 15% of the mixture of a non-toxic food grade surfactant consisting essentially of long chain fatty acid moieties and at least one of polyoxyalkylene and polyhydroxy moieties and having an HLB rating of below about 15 and an effective amount to tighten the surfactant film when applied to said potatoes to about 15% of the mixture of an organic acid which is selected from the group consisting of mono- or polycarboxylic acids having from 2 to 6 carbon atoms and at least one hydroxy or oxo group, and lactones thereof, excepting those dicarboxylic acids which readily form internal anhydrides.

* * * * *